US010343638B2

(12) United States Patent
Fukawatase et al.

(10) Patent No.: US 10,343,638 B2
(45) Date of Patent: Jul. 9, 2019

(54) VEHICULAR SEAT INSTALLED WITH SIDE AIRBAG DEVICE

(71) Applicant: TOYOTA JIDOSHA KABUSHIKI KAISHA, Toyota-shi, Aichi-ken (JP)

(72) Inventors: Osamu Fukawatase, Miyoshi (JP); Takamichi Komura, Okazaki (JP); Hiroe Sugawara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/673,545

(22) Filed: Aug. 10, 2017

(65) Prior Publication Data
US 2018/0050651 A1    Feb. 22, 2018

(30) Foreign Application Priority Data

Aug. 22, 2016  (JP) ................................. 2016-162266

(51) Int. Cl.
| | | |
|---|---|---|
| B60R 21/207 | (2006.01) | |
| B60R 21/233 | (2006.01) | |
| B60R 21/237 | (2006.01) | |
| B60R 21/231 | (2011.01) | |
| B60R 21/00 | (2006.01) | |

(52) U.S. Cl.
CPC .......... B60R 21/207 (2013.01); B60R 21/233 (2013.01); B60R 21/237 (2013.01); B60R 21/23138 (2013.01); B60R 2021/0006 (2013.01); B60R 2021/0032 (2013.01); B60R 2021/0058 (2013.01); B60R 2021/23107 (2013.01)

(58) Field of Classification Search
CPC ............ B60R 21/207; B60R 21/23138; B60R 21/233; B60R 2021/0058; B60R 2021/23107; B60R 2021/23146; B60R 2021/23308
See application file for complete search history.

(56) References Cited

U.S. PATENT DOCUMENTS 5,826,938 A * 10/1998 Yanase .................. B60R 21/207
                                                          297/216.13
5,913,536 A *  6/1999 Brown .................. B60R 21/207
                                                          280/728.2
(Continued)

FOREIGN PATENT DOCUMENTS

| CN | 103144602 A | 6/2013 |
|---|---|---|
| CN | 104487294 A | 4/2015 |

(Continued)

*Primary Examiner* — Frank B Vanaman
(74) *Attorney, Agent, or Firm* — Oliff PLC

(57) ABSTRACT

In a vehicular seat installed with a side airbag device, an inside bag completes inflation and deployment earlier than a side air bag body, on the inner side of the side airbag body in the vehicle width direction, and presses an occupant inward in the vehicle width direction. The inside bag inflates and deploys at an upper level than the abdominal region of the occupant. Further, reaction force is applied inward in the vehicle width direction from a reaction force plate supported by an outer side frame, to the inside bag. The reaction force plate extends in a vehicle front-back direction, and extends toward the front of the vehicle beyond a front edge portion of the outer side frame.

13 Claims, 12 Drawing Sheets

(56) References Cited

U.S. PATENT DOCUMENTS

| | | | |
|---|---|---|---|
| 6,113,135 A * | 9/2000 | Tsutsumi | B60R 21/207 280/730.2 |
| 7,819,423 B2 * | 10/2010 | Loibl | B60R 21/207 280/728.2 |
| 2002/0185845 A1 * | 12/2002 | Thomas | B60R 21/232 280/729 |
| 2005/0104342 A1 * | 5/2005 | Jackson | B60R 21/23138 280/730.2 |
| 2010/0244412 A1 | 9/2010 | Yamashita | |
| 2011/0169250 A1 | 7/2011 | Breuninger et al. | |
| 2012/0223550 A1 | 9/2012 | Mazanek et al. | |
| 2013/0147167 A1 | 6/2013 | Kwon et al. | |
| 2013/0257027 A1 | 10/2013 | Kwon | |
| 2014/0035264 A1 | 2/2014 | Fukushima et al. | |
| 2015/0048602 A1 * | 2/2015 | Gwon | B60R 21/207 280/729 |
| 2015/0166003 A1 | 6/2015 | Fujiwara | |
| 2015/0239423 A1 * | 8/2015 | Hayashi | B60R 21/231 280/729 |
| 2017/0008437 A1 | 1/2017 | Tanabe et al. | |
| 2017/0225640 A1 | 8/2017 | Ohno | |

FOREIGN PATENT DOCUMENTS

| | | |
|---|---|---|
| DE | 102011117939 A1 | 5/2013 |
| EP | 2397376 A1 | 12/2011 |
| JP | 2008-087631 A | 4/2008 |
| JP | 2009-018715 A | 1/2009 |
| JP | 2009-023490 A | 2/2009 |
| JP | 2009-023494 A | 2/2009 |
| JP | 2010-228668 A | 10/2010 |
| JP | 2011-527965 A | 11/2011 |
| JP | 2014-019393 A | 2/2014 |
| JP | 2014-031096 A | 2/2014 |
| JP | 5485990 B2 | 5/2014 |
| JP | 2015-163488 A | 9/2015 |
| KR | 10-2013-0008337 A | 1/2013 |
| KR | 10-2013-0109704 A | 10/2013 |
| WO | 2013/008999 A1 | 1/2013 |

* cited by examiner

VEHICULAR SEAT INSTALLED WITH SIDE AIRBAG DEVICE

INCORPORATION BY REFERENCE

The disclosure of Japanese Patent Application No. 2016-162266 filed on Aug. 22, 2016 including the specification, drawings and abstract is incorporated herein by reference in its entirety.

BACKGROUND

1. Technical Field

The disclosure relates to a vehicular seat on which a side airbag device is installed.

2. Description of Related Art

In a side airbag device described in Japanese Patent Application Publication No. 2008-87631 (JP 2008-87631 A), an auxiliary inflating portion (inside bag) is provided at a position closer to the inner side in the vehicle width direction than a main inflating portion (outside bag). The inside bag inflates and deploys earlier than the outside bag within a side portion of a seat back, at the time of a side-impact crash, so as to press a region of an occupant or passenger from the shoulder region to the abdominal region, from behind in the vehicle front-back direction. Thus, the inside bag is configured to move the upper half of the body of the occupant obliquely forward to the vehicle inner side (the inner side in the vehicle width direction).

SUMMARY

In the side airbag device constructed as described above, the inside bag that inflates and deploys earlier than the outside bag is able to restrain the occupant in the initial period of the side-impact crash. However, in the side airbag device, a region of the occupant which is pressed by the inside bag has not been sufficiently considered, in view of the relationship with the load tolerance of the body of the occupant. Also, at the a level higher than the abdominal region of the occupant, in particular, at a level higher than the center of gravity of the chest region of the occupant, the side frame is generally inclined so as to be spaced backward away from the body of the occupant as viewed in a side view of the vehicle. Therefore, it is difficult for the upper side of the inside bag that is inflated and deployed to receive inward reaction force in the vehicle width direction from the side frame, and the upper part of the inside bag may bend outward in the vehicle width direction when the inside bag restrains the occupant. Thus, in the side airbag device constructed as described above, there is a room for improvement in terms of the initial occupant restraint performance of the inside bag at the time of a side-impact crash.

The disclosure provides a vehicular seat installed with a side airbag device capable of improving the initial occupant restraint performance of an inside bag at the time of a side-impact crash.

A vehicular seat installed with a side airbag device according to one aspect of the disclosure includes a seat back, an inflator, an outside bag, an inside bag, and a reaction force plate. The seat back includes a side frame and a side portion on an outer side in a vehicle width direction. The inflator is placed on an outer side of the side frame in the vehicle width direction, within the side portion of the seat back. The outside bag is placed on the outer side of the side frame in the vehicle width direction, within the side portion and adapted to inflate and deploy between a side portion of a vehicle interior and an occupant, when gas is supplied from the inflator housed in the outside bag. The inside bag is connected to an inner portion of the outside bag in the vehicle width direction, on a vehicle front side of the side frame. The inside bag is adapted to inflate and deploy in the side portion when gas is supplied from the inflator, at a level higher than an abdominal region of the occupant and adapted to complete inflation and deployment earlier than the outside bag, so as to press the occupant inward in the vehicle width direction. The reaction force plate extends in a vehicle front-back direction as viewed in a plane section of the seat back and is supported by the side frame such that the reaction force plate extends toward a front of the vehicle beyond a front edge portion of the side frame as viewed in a side view of the vehicle. The reaction force plate is adapted to apply reaction force inward in the vehicle width direction, to the inside bag, at the time of inflation and deployment.

According to the above aspect of the disclosure, if a side-impact crash of the vehicle is detected, for example, the inflator placed on the outer side of the side frame in the vehicle width direction within the side portion of the seat back is activated. As a result, the outside bag placed on the outer side of the side frame in the vehicle width direction within the side portion inflates and deploys between a side portion of the vehicle interior and the occupant, and the inside bag connected to a widthwise inner portion of the outside bag on the vehicle front side of the side frame inflates and deploys in the side portion of the seat back. The inside bag completes its inflation and deployment earlier than the outside bag, and presses the occupant inward in the vehicle width direction.

Here, the inside bag inflates and deploys at a level higher than the abdominal region of the occupant. Thus, the abdominal region having a relatively low load tolerance, in the body of the occupant, can be prevented from being pressed by the inside bag; therefore, the internal pressure of the inside bag can be increased. Further, reaction force is applied inward in the vehicle width direction from the reaction force plate supported by the side frame to the inside bag. The reaction force plate extends in the vehicle front-back direction as viewed in a plane section of the seat back, and extends toward the front of the vehicle beyond the front edge portion of the side frame as viewed in the side view of the vehicle. With this arrangement, even at the level (at a level higher than the center of gravity of the chest region of the occupant, for example) at which the inside bag is less likely or unlikely to receive widthwise inward reaction force from the side frame, the widthwise inward reaction force can be favorably applied to the inside bag. It follows that, according to this disclosure, the initial occupant restraint performance of the inside bag at the time of a side-impact crash can be improved.

In the vehicular seat according to the above aspect of the disclosure, at least a part of the inside bag that is inflated and deployed may be adapted to overlap with a shoulder blade of the occupant as viewed in the side view of the vehicle.

With the above arrangement, at least a part of the inside bag that is inflated and deployed can press the shoulder blade of the occupant inward in the vehicle width direction. Since the shoulder blade of the occupant has a relatively high load tolerance, in the body of the occupant, and extends laterally, it is possible to increase the internal pressure of the inside bag, and effectively move the occupant inward in the vehicle width direction.

In the vehicular seat according to the above aspect of the disclosure, the lower end of the reaction force plate may be configured to be located at a level higher than an upper surface of an arm rest portion provided on a door trim of a side door.

With the above arrangement, the reaction force plate is placed at a level higher than a narrow gap between the arm rest portion of the side door and the side frame of the seat back. Thus, the installation space of the reaction force plate can be easily secured.

The vehicular seat according to the above aspect may further include a mounting bracket housed in the outside bag, and the mounting bracket, the inflator, the outside bag, and the inside bag may constitute an airbag module. The mounting bracket may be attached to the side frame, and the reaction force plate may be formed integrally with the mounting bracket.

With the above arrangement, the reaction force plate constitutes the airbag module, and is formed integrally with the mounting bracket attached to the side frame. Thus, the reaction force plate can be reinforced with the mounting bracket. As a result, the reaction force plate can increase the reaction force applied to the inside bag. Also, the number of components can be reduced, and the production cost can be reduced.

In the vehicle seat as described above, the side frame may have a module mounting portion that extends outward in the vehicle width direction, and the mounting bracket may be fastened and fixed to the module mounting portion, by use of a stud bolt of the inflator.

With the above arrangement, the mounting bracket formed integrally with the reaction force plate is fastened and fixed to the module mounting portion of the side frame, by use of the stud bolt of the inflator. This makes it unnecessary to provide a dedicated fastening member for fastening and fixing the reaction force plate and the mounting bracket to the side frame. Further, since the module mounting portion of the side frame extends outward in the vehicle width direction, the fastening operation can be performed outside the side frame in the vehicle width direction, with high efficiency.

In the vehicular seat according to the above aspect of the disclosure, the inflator may be formed in an elongated shape having a longitudinal direction parallel to a vertical direction of the seat back, and the inflator may have a gas jetting part provided in an upper end portion, and allow gas to be ejected from the gas jetting part.

In the vehicular seat as described above, the gas jetting part is provided in the upper end portion of the inflator that is formed in an elongated shape having the longitudinal direction parallel to the vertical direction of the seat back. With this arrangement, the gas jetting part can be positioned close to the inflated and deployed inside bag at a level higher than the abdominal region of the occupant; therefore, gas is likely to be promptly supplied to the inside bag. This positioning of the gas jetting part constitutes to early inflation and deployment of the inside bag.

In the vehicular seat as described above, the reaction force plate may be housed in the outside bag, and a part of the reaction force plate and the gas jetting part of the inflator may be covered from an outer side in the vehicle width direction with a gas guide plate. An inside gas supply hole for supplying gas from the inflator into the inside bag may be formed in a portion of the reaction force plate which is opposed to the gas guide plate and is located closer to the front of the vehicle than the gas jetting part.

In the vehicular seat as described above, gas ejected from the gas jetting part of the inflator placed on the outer side of the side frame in the vehicle width direction flows between the gas guide plate and the reaction force plate, and is supplied to the inside bag through the inside gas supply hole formed in the reaction force plate. Thus, even in the arrangement in which the inflator is placed on the outer side of the side frame in the vehicle width direction, where the installation space can be easily secured, gas can be promptly supplied to the inside bag.

In the vehicular seat as described above, the inside gas supply hole may include a multiplicity of through-holes.

With the above arrangement, a portion of the reaction force plate having the multiplicity of through-holes can function as a reaction force surface that applies reaction force to the inside bag. As a result, a wide area of reaction force surface can be easily ensured, as compared with the arrangement in which a single large inside gas supply hole is formed in the reaction force plate.

In the vehicular seat as described above, the multiplicity of through-holes may be inclined so as to be closer to the front of the vehicle, in a direction toward an inner side in the vehicle width direction.

In the vehicular seat as described above, since the through-holes formed in the reaction force plate are inclined in the manner as described above, gas ejected from the gas jetting part located rearward of the through-holes is likely to smoothly flow into the through-holes.

In the vehicular seat as described above, the multiplicity of through-holes may be formed such that an opening area of one of the through-holes is larger as the one is located closer to the gas jetting part.

With the above arrangement, gas ejected from the gas jetting part can efficiently flow into the multiplicity of through-holes.

In the vehicular seat as described above, an outside gas supply hole for supplying gas ejected from the gas jetting part to the outside bag may be formed in a portion of the gas guide plate which is opposed to the gas jetting part.

With the above arrangement, the gas ejected from the gas jetting part of the inflator is supplied to the inside bag through the inside gas supply hole formed in the reaction force plate, and is also supplied to the outside bag through the outside gas supply hole formed in the gas guide plate. Thus, it is possible to easily change the completion timing of inflation and deployment of the inside bag and the outside bag, by adjusting the areas of openings of the inside gas supply hole and the outside gas supply hole.

In the vehicular seat as described above, the inside bag prior to inflation and deployment may be accordion-folded on an inner side of the side frame in the vehicle width direction.

In the seat as described above, the inside bag is accordion-folded as described above. The according-folding, which is excellent in terms of inflation and deployment performance, contributes to early inflation and deployment of the inside bag.

As described above, the vehicular seat installed with the side airbag device according to this disclosure is able to improve the initial occupant restraint performance of the inside bag at the time of a side-impact crash.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
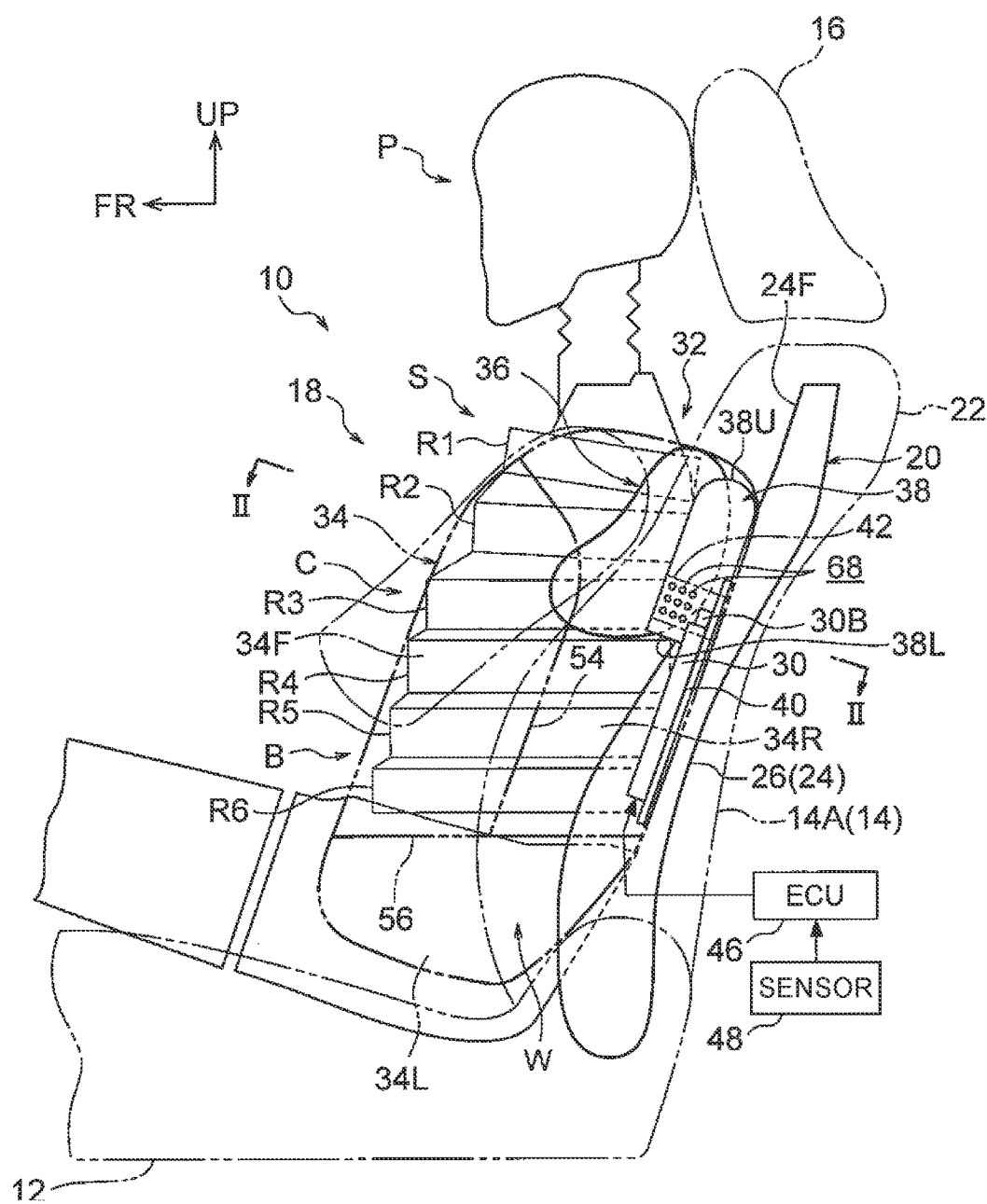
FIG. 1 is a side view of a vehicular seat installed with a side airbag device according to one embodiment of the disclosure, showing a condition where an outside bag and an inside bag are inflated and deployed.

Referring to FIG. 1 through FIG. 11C, a vehicular seat 10 installed with a side airbag device according to one embodiment of the disclosure (which will be simply called "vehicular seat 10") will be described. Arrow FR, arrow UP, and arrow OUT denoted as needed in each of the drawings indicate the front direction (travelling direction), upward direction, and widthwise outward direction of the vehicle, respectively. When the front-back direction, lateral direction, and the vertical direction are simply referred to in the following description, they represent the front-back or longitudinal direction of the vehicle, the lateral direction (width direction) of the vehicle, and the vertical direction of the vehicle, respectively, unless otherwise particularly stated. In each of the drawings, some reference numerals may be omitted, for the sake of easy understanding of the drawings.

<Overall Configuration of Vehicular Seat 10> Initially, the overall configuration of the vehicular seat 10 will be described, and then a principal part of this embodiment will be described. As shown in FIG. 1, the vehicular seat 10 includes a seat cushion 12, a seat back 14 coupled to a rear end portion of the seat cushion 12 such that the seat back 14 can be reclined, and a head rest 16 coupled to an upper end portion of the seat back 14. In the vehicular seat 10, a side airbag device 18 is installed in a side portion (side support portion) 14A of the seat back 14 on the outer side in the vehicle width direction. The vehicular seat 10 provides a driver's seat of a left-hand drive vehicle, or a passenger seat of a right-hand drive vehicle, and is located on the left-hand side in the vehicle interior. The front-back direction, lateral direction (width direction), and vertical direction of the vehicular seat 10 are identical with the front-back direction, lateral direction (width direction), and vertical direction of the vehicle. When the vehicular seat 10 is located on the right-hand side in the vehicle interior, the seat 10 is configured in a symmetrical arrangement with respect to that of this embodiment.

Figure 2:
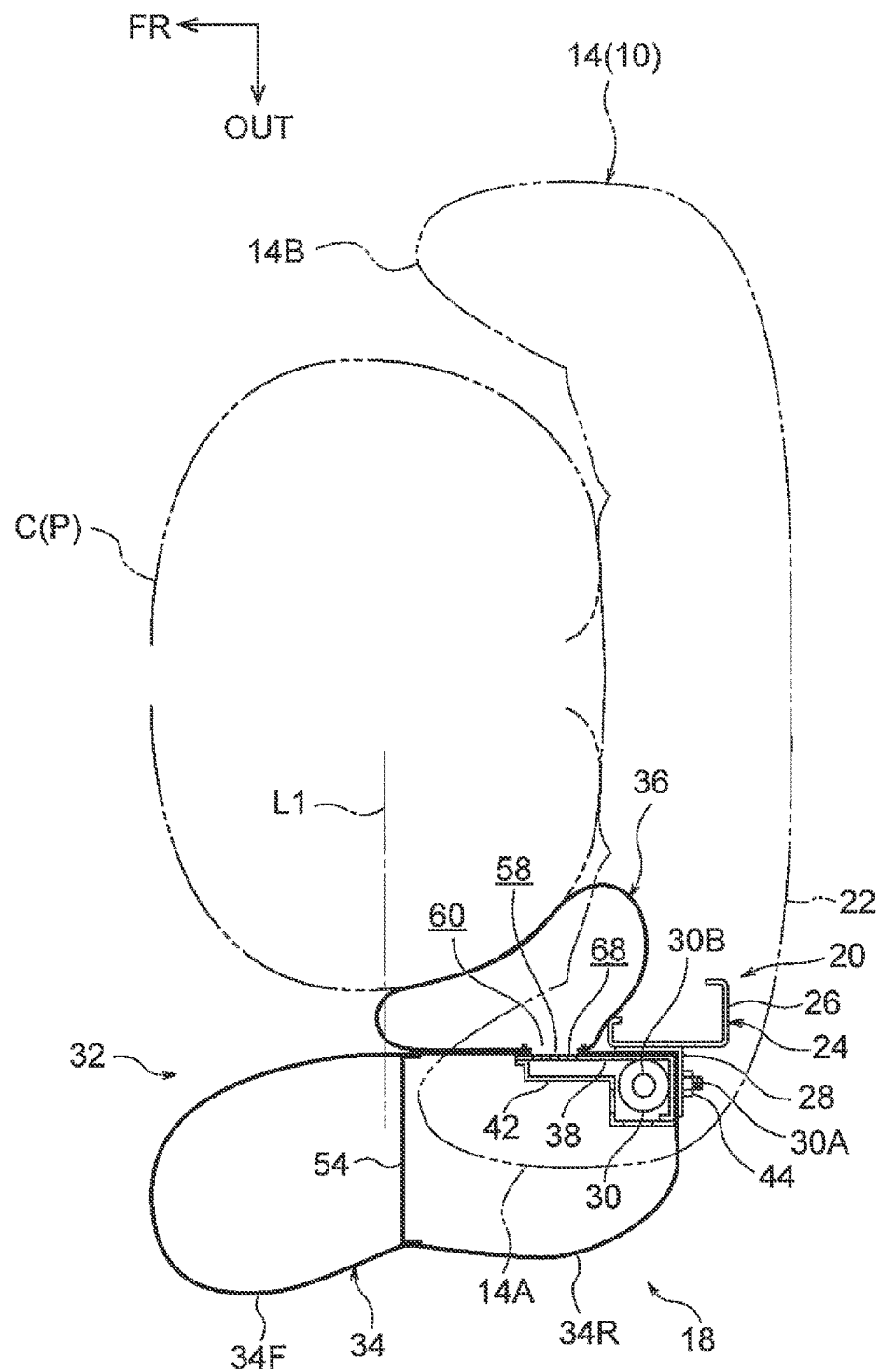
FIG. 2 is an enlarged cross-sectional view showing a cutting plane taken along line II-II of FIG. 1.

In FIG. 1, a dummy P for use in an impact test is seated in the vehicular seat 10, in place of an actual occupant. In FIG. 2, a chest region C of the dummy P is schematically indicated by a two-dot chain line. The dummy P is an AM50 (50th percentile American adult male) type World Side Impact Dummy (WorldSID). The dummy P is seated in the vehicular seat 10 in a seating posture specified by a side-impact crash test procedure, and the position of the seat back 14 in the front-back direction of the vehicle, and the angle of inclination of the seat back 14 relative to the seat cushion 12 are adjusted so as to comply with a reference set position corresponding to the above seating posture. In the following, the dummy P may be called "occupant P".

As shown in FIG. 1 and FIG. 2, the seat back 14 includes a seat-back frame 20 as a skeleton member made of metal, a seat-back pad (cushion material) (not shown) that covers the seat-back frame 20, and a seat skin 22 that covers the seat-back pad. The seat-back frame 20 includes an outer side frame 24 provided in the side portion 14A of the seat back 14 on the outer side in the vehicle width direction, and an inner side frame (not shown) provided in a side portion (side support portion) 14B of the seat back 14 on the inner side in the vehicle width direction. The seat-back frame 20 further includes an upper frame (not shown) that connects upper end portions of the outer side frame 24 and the inner side frame with each other in the vehicle width direction, and a lower frame (not shown) that connects lower end portions of the outer side frame 24 and the inner side frame with each other in the vehicle width direction. The outer side frame 24 is one example of "side frame" according to the disclosure. In the following description, the side portion 14A will be called "outer side portion 14A".

Figure 3:
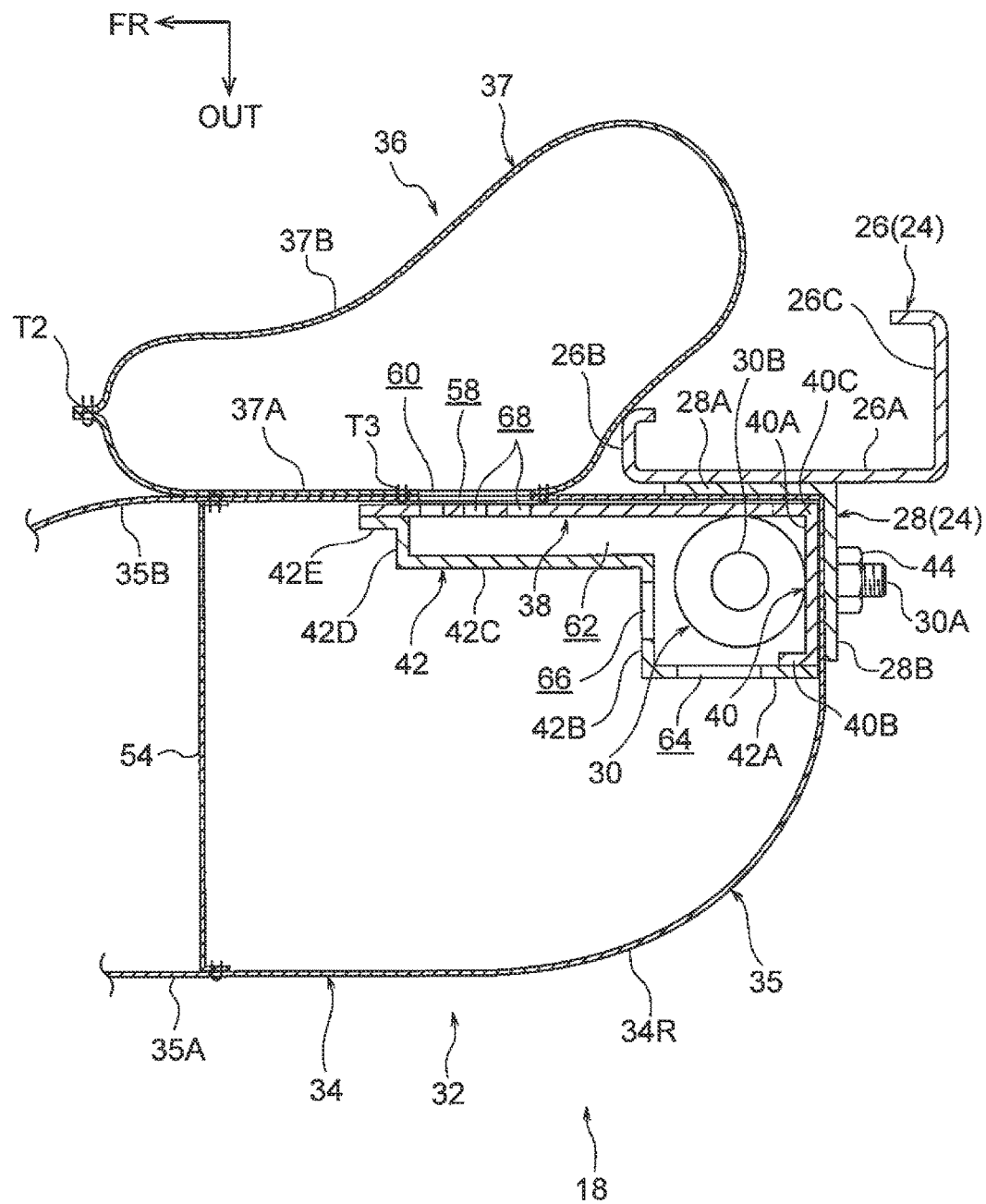
FIG. 3 is an enlarged cross-sectional view showing a part of FIG. 2.
Figure 4:
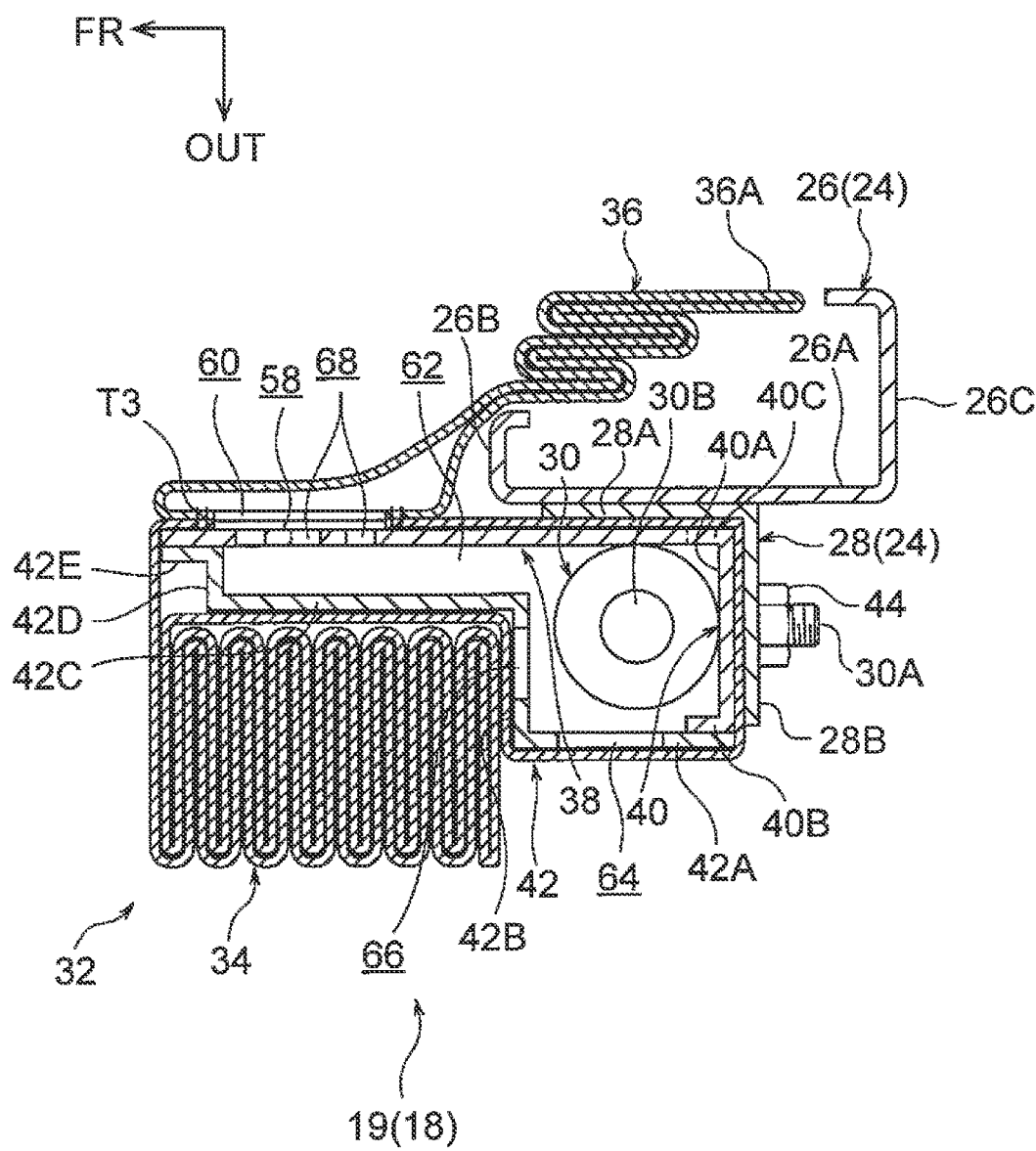
FIG. 4 is a cross-sectional view corresponding to FIG. 3, showing the outside bag and the inside bag in folded states.
Figure 5:
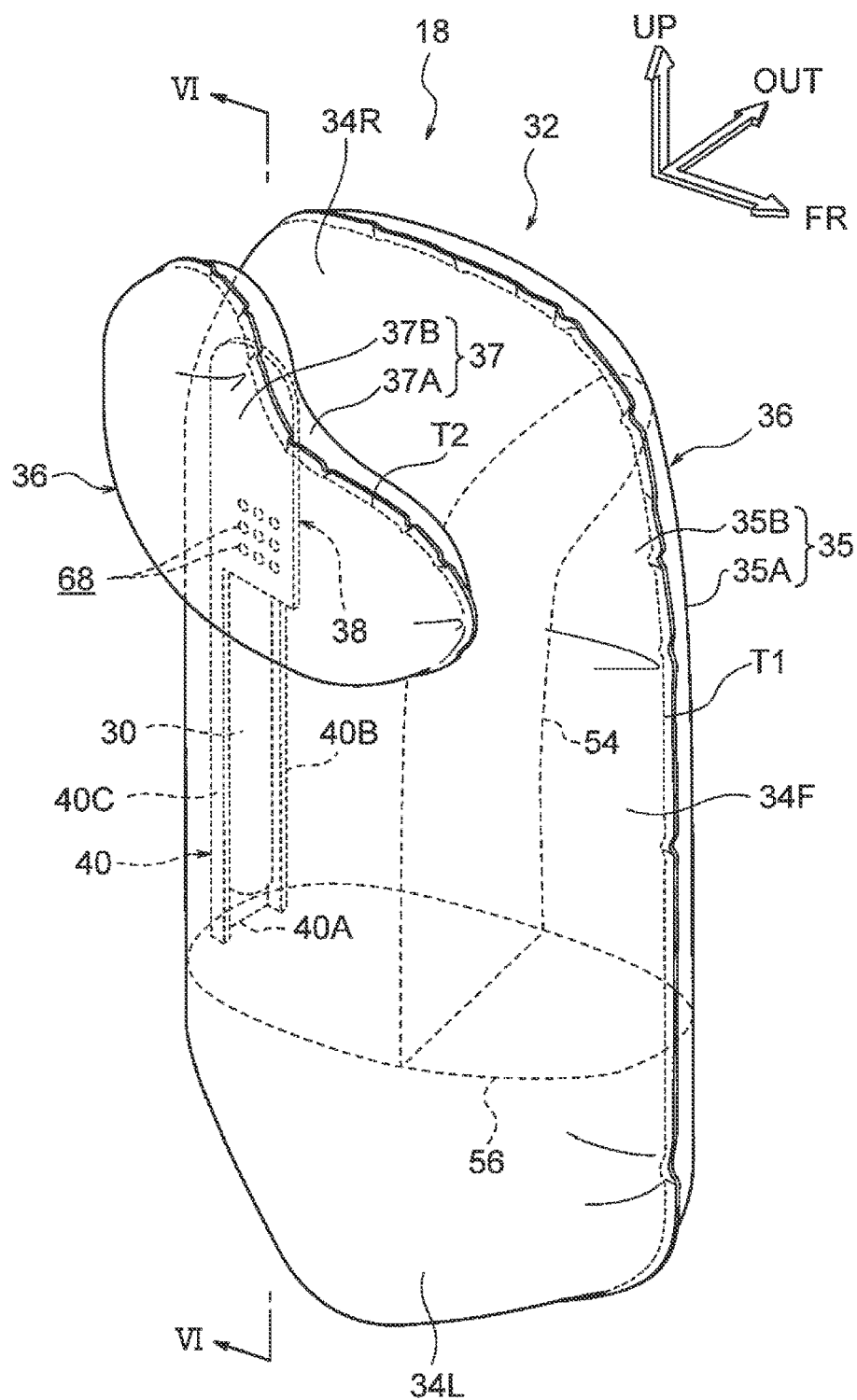
FIG. 5 is a perspective view showing the outside bag and inside bag that are inflated and deployed, as viewed from the front of the vehicle and the inner side in the vehicle width direction.

As shown in FIG. 2 through FIG. 4, the outer side frame 24 consists of a side frame body 26, and a fixed plate 28 (not shown in FIG. 1). The side frame body 26 is formed in a generally U shape in cross-section, and is open inward in the vehicle width direction as viewed in a plane section of the seat back 14, and includes a side wall portion 26A, a front flange portion 26B, and a rear flange portion 26C. The side wall portion 26A extends in the vehicle front-back direction as viewed in the plane section of the seat back 14. The front flange portion 26B extends inward in the vehicle width direction from a front end of the side wall portion 26A, and its distal end portion bends toward the rear of the vehicle. The rear flange portion 26C extends inward in the vehicle width direction from a rear end of the side wall portion 26A, and its distal end portion bends toward the front of the vehicle. A dimension of the rear flange portion 26C as measured in the vehicle width direction is set to be larger than that of the front flange portion 26B. The above-mentioned inner side frame is formed in a shape symmetrical to that of the side frame body 26.

The fixed plate 28 is formed by bending a metal plate into an L shape in cross-section, for example, and is elongated in a longitudinal direction parallel to the vertical direction of the seat back 14 (direction in which the upper end and lower end of the seat back 14 are connected) as seen from the vehicle width direction. The fixed plate 28 consists of a plate-like fixed portion 28A fixed to an outside surface (in the vehicle width direction) of the side wall portion 26A of the side frame body 26 by means, such as welding, and a plate-like module mounting portion 28B that extends outward in the vehicle width direction from a rear end portion of the fixed portion 28A. The fixed plate 28 corresponds to the side airbag device 18.

As shown in FIG. 1 through FIG. 6, the side airbag device 18 includes an inflator 30, side airbag 32, reaction force plate 38, mounting bracket 40, and a retainer 42 as a gas guide plate. The side airbag 32 includes a side airbag body 34 as an outside bag, and an inside bag 36. The inside bag 36, mounting bracket 40, reaction force plate 38, and the retainer 42 constitute a principal part of this embodiment, and thus will be described in detail later. Initially, the configurations of the inflator 30 and the side airbag body 34 will be described.

<Configuration of Inflator 30> The inflator 30 is a so-called cylinder-type inflator, and is formed in an elongated columnar shape. This inflator 30 is placed on the outer side (in the vehicle width direction) of the side wall portion 26A of the outer side frame 24 such that the axial direction (longitudinal direction) of the inflator 30 is parallel to the vertical direction of the seat back 14. The inflator 30 is also located on the vehicle front side relative to the module mounting portion 28B of the fixed plate 28. A pair of upper and lower stud bolts 30A (see FIG. 2-FIG. 4, not shown in the other drawings) protrude rearward from an outer peripheral portion of the inflator 30. The stud bolts 30A pass through the module mounting portion 28B, and nuts 44 are screwed to their distal end portions. With this arrangement, the inflator 30 is fastened and fixed (so-called back-face fastening) to the fixed plate 28, or the outer side frame 24.

A gas jetting part 30B is provided in an upper end portion or lower end portion (upper end portion in this embodiment) of the inflator 30. The gas jetting part 30B is formed with a plurality of gas jetting ports (see FIG. 8) arranged in the circumferential direction of the inflator 30. When the inflator 30 is started (activated), gas is ejected radially from the plurality of gas jetting ports. As shown in FIG. 1, an ECU (Electronic Control Unit) 46 is electrically connected to the inflator 30. A side impact sensor 48 that detects a side-impact crash is electrically connected to the ECU 46. The ECU 46 and the side impact sensor 48 constitute a control system of the side airbag device 18. Examples of the side impact sensor 48 include pressure sensors or acceleration sensors (inside-door sensors) placed in a front side door and a rear side door, and acceleration sensors (insider-pillar sensors) placed in a B pillar and a C pillar.

The ECU 46 activates the inflator 30 when it detects a side-impact crash of the vehicle based on a signal from the side impact sensor 48. When a crash prediction sensor (precrash sensor) that predicts (foresees) a side-impact crash is electrically connected to the ECU 46, the ECU 46 may be configured to activate the inflator 30 when it predicts a side-impact crash based on a signal from the crash prediction sensor. As the crash prediction sensor, a millimeter-wave radar or a stereo camera may be used, for example.

<Configuration of Side Airbag Body 34> The side airbag body 34 is located on the outer side in the vehicle width direction relative to the outer side frame 24. The side airbag body 34 is formed by sewing in the shape of a bag, using a single sheet of base fabric 35 that is cut out of a nylon-containing or polyester-containing fabric material. More specifically, the above base fabric 35 is folded in two, and one side portion 35A and the other side portion 35B of the base fabric 35 are superimposed on each other. Then, outer peripheral portions of the base fabric 35 folded in two are sewed together at a sewed portion T1 (see FIG. 5 and FIG. 6, not shown in FIG. 1-FIG. 4).

A method of producing the side airbag body 34 is not limited to the above method, but may be changed as appropriate. For example, two sheets of base fabric may be superimposed on each other, and their outer peripheral portions may be sewed together, so that the side airbag body 34 is produced. The side airbag body 34 may also be produced by a hollow weaving method (so-called OPW method) using an automatic loom. This point also applies to the inside bag 36 which will be described later.

The side airbag body 34 is a so-called three-chamber side airbag, and is partitioned into a front bag portion 34F, rear bag portion 34R, and a lower bag portion 34L, by a front-back partition part 54 and a vertical partition part 56. Each of the front-back partition part 54 and the vertical partition part 56 is a tether (partition wall, or partition fabric) placed inside the side airbag body 34, and is formed by cutting a fabric material similar to the base fabric 35 of the side airbag body 34 into a long strap or band, for example. Each of the front-back partition part 54 and the vertical partition part 56 is attached to the base fabric 35 such that one long edge portion of the partition part is sewed to the one side portion 35A of the base fabric 35, and the other long edge portion is sewed to the other side portion 35B of the base fabric 35. The front-back partition part 54 and the vertical partition part 56 are not limited to the form of tethers, but may be configured as sewn parts formed by sewing the one side portion 35A and the other side portion 35B of the base fabric 35 to each other. The number of chambers in the side airbag body 34 is not limited to the above-indicated number, but may be changed as appropriate.

The inflator 30 as described above is housed in a rear end portion of the rear bag portion 34R, and the upper and lower stud bolts 30A of the inflator 30 pass through a rear end portion of the rear bag portion 34R and the module mounting portion 28B, to be engaged with the nuts 44. Thus, the side airbag body 34 is fastened and fixed to the module mounting portion 28B, using the inflator 30. Gas generated by the inflator 30 in the rear bag portion 34R is supplied into the front bag portion 34F and the lower bag portion 34L, through communication ports (openings) (not shown) formed in the front-back partition part 54 and the vertical partition part 56, respectively. As a result, the side airbag body 34 inflates and deploys to the seat front side of the outer side portion 14A, to be interposed between the occupant P and a side portion of a vehicle body (in this embodiment, a door trim 51 of a front side door 50 shown in FIG. 6 and a B-pillar garnish that is not illustrated). In the figures other than FIG. 6, the door trim 51 (front side door 50) is not illustrated.

The side airbag body 34 constructed as described above is formed so as to assume a generally rectangular shape (generally oval shape) having a long dimension along the vertical direction of the seat back 14, as seen from the vehicle width direction, when it is in an inflated and deployed state as shown in FIG. 1. The side airbag body 34 in this state is able to restrain a shoulder region S, chest region C, abdominal region B, and a lumbar region W of the occupant P, from the outside in the vehicle width direction. When the side airbag body 34 is in the inflated and deployed state, front portions of the chest region C and abdominal region B of the occupant P are restrained by the front bag portion 34F, and rear portions of the chest region C and abdominal region B and the shoulder region S are restrained by the rear bag portion 34R, while the lumbar region W is restrained by the lower bag portion 34L. The size of the side airbag body 34 is not limited to the one as described above, but may be changed as appropriate. For example, the side airbag body 34 may be formed in a size that enables the body 34 to restrain a range of the occupant P from the shoulder region S to the abdominal region B.

The side airbag body 34 constructed as described above, inflator 30, inside bag 36, mounting bracket 40, reaction force plate 38, and the retainer 42 constitute an airbag module 19 shown in FIG. 4, and the airbag module 19 is normally housed in the outer side portion 14A. In the airbag module 19, the side airbag body 34 that is folded is wrapped with a wrapping material (not shown) that can be easily teared. The side airbag body 34 is accordion-folded in the vehicle front-back direction, and is vertically folded in two at a vertically middle portion, for example.

<Principal Part of Embodiment> Next, a principal part of this embodiment will be described. As described above, the side airbag device 18 according to this embodiment includes the inside bag 36, reaction force plate 38, mounting bracket 40, and the retainer 42. These constituent elements will be described in detail.

<Configuration of Inside Bag 36> As shown in FIG. 1 through FIG. 6, the inside bag 36 is formed by sewing in the shape of a bag, using a single sheet of base fabric 37 formed by cutting it out of a fabric material similar to the base fabric 35 of the side airbag body 34. More specifically, the base fabric 37 is folded in two, such that one side portion 37A and the other side portion 37B of the base fabric 37 are superimposed on each other, and outer peripheral portions of the base fabric 37 thus folded in two are sewed together at a sewed portion T2 (see FIG. 3, FIG. 5, and FIG. 6, not shown in FIG. 1, FIG. 2, and FIG. 4). The inside bag 36 thus formed has a sufficiently small volume as compared with the side airbag body 34.

As shown in FIG. 2 to FIG. 4, the inside bag 36 is connected to a widthwise inner region of the side airbag body 34 on the vehicle front side of the outer side frame 24. More specifically, the inside bag 36 is superimposed on the upper part of the rear bag portion 34R, from the inner side in the vehicle width direction. At the location where the inside bag 36 and the rear bag portion 34R are superimposed, communication ports 58, 60 are formed in the other side portion 35B of the base fabric 35 of the side airbag body 34, and the one side portion 37A of the base fabric 37 of the inside bag 36, respectively. Then, a peripheral portion of the communication port 58 of the base fabric 35 and a peripheral portion of the communication port 60 of the base fabric 37 are sewed together at a sewed portion T3 shown in FIG. 3, FIG. 4 and FIG. 6. As a result, the inside bag 36 is connected (coupled) to the upper part of the rear bag portion 34R, such that the interior of the upper part of the rear bag portion 34R communicates with the interior of the inside bag 36 via the communication ports 58, 60. With this arrangement, gas generated by the inflator 30 in the rear bag portion 34R is supplied into the inside bag 36 via the communication ports 58, 60, so that the inside bag 36 is inflated and deployed.

The inside bag 36, which is in the inflated and deployed state, is located so as to overlap with the shoulder region S and a rear part of the chest region C of the occupant P, when it is viewed in the vehicle width direction as shown in FIG. 1, and at least a part of the inside bag 36 is arranged to overlap with the shoulder blade (a region of the dummy P corresponding to the shoulder blade). The inside bag 36 completes inflation and deployment earlier than the side airbag body 34, and presses the shoulder region S and the rear part of the chest region C (the shoulder blade and its surroundings) of the occupant P inward in the vehicle width direction. A front edge portion of the inside bag 36 is formed so as to be recessed toward the rear side and lower side of the vehicle, and curved along the back face of the shoulder region S.

Also, the inside bag 36 is arranged to be inflated and deployed at a level higher than the center of the inflated/deployed side airbag body 34 in the vertical direction, as shown in FIG. 1. More specifically, the inside bag 36 is arranged to be inflated and deployed at a level higher than a rib R5, which is the second rib as counted from the bottom, out of six ribs R1, R2, R3, R4, R5, R6 provided in the body of the dummy P (see FIG. 1) seated in the vehicular seat 10. Thus, at least when an occupant having substantially the same physical size as the dummy P, or an occupant having the smaller size than the dummy P, is seated in the vehicular seat 10, the pressing force of the inside bag 36 is kept from being directly applied to the abdominal region having a relatively low load tolerance in the body of the occupant. The above-mentioned "occupant having the smaller size" may be an occupant having substantially the same physical size as an AF05 (5th percentile American adult female) type World Side Impact Dummy (WorldSID), for example.

The above-mentioned ribs R1, R2, R3, R4, R5, R6 are called "shoulder rib R1", "chest upper rib R2", "chest middle rib R3", "chest lower rib R4", "abdomen upper rib R5", and "abdomen lower rib R6", which are arranged in this order from the top. The shoulder rib R1 is provided in the shoulder region S of the dummy P, and the chest upper rib R2, chest middle rib R3, and the chest lower rib R4 are provided in the chest region C of the dummy P, while the abdomen upper rib R5 and the abdomen lower rib R6 are provided in the abdominal region B of the dummy P.

As shown in FIG. 2, the inside bag 36 inflates and deploys slightly forward of the center (see one-dot chain line L1 in FIG. 2) of the chest region C of the occupant P in the front-back direction. Thus, the inside bag 36 is arranged to press the middle and rear portions of the chest region C in the front-back direction, inward in the vehicle width direction. In FIG. 2, the seat back 14 indicated by a virtual line is illustrated in the shape prior to inflation and deployment of the side airbag body 34 and the inside bag 36. However, the inside bag 36 is arranged to inflate and deploy within the outer side portion 14A, while causing the outer side portion 14A to expand inward in the vehicle width direction and toward the front side of the vehicle.

The inside bag 36 constructed as described above, inflator 30, side airbag body 34, mounting bracket 40, reaction force plate 38, and the retainer 42 constitute the airbag module 19 shown in FIG. 4, and the airbag module 19 is normally housed in the outer side portion 14A. In the airbag module 19, the inside bag 36 is accordion-folded on the inner side of the outer side frame 24 in the vehicle width direction. A distal end portion 36A of the accordion-folded inside bag 36 is engaged with the rear flange portion 26C or side wall portion 26A of the side frame body 26, by means of a clip (not shown). This clip is adapted to release the above engagement, when the inside bag 36 is inflated and deployed.

<Configuration of Mounting Bracket 40> As shown in FIG. 1 through FIG. 10, the mounting bracket 40 is formed by bending a sheet metal into a generally U shape in cross-section, for example, such that the mounting bracket 40 is elongated in a longitudinal direction parallel to the vertical direction of the seat back 14. The mounting bracket 40 is housed in the rear bag portion 34R of the side airbag body 34, and is located between the rear end portion of the rear bag portion 34R and the inflator 30.

The mounting bracket 40, which assumes a generally U shape in cross-section, is open toward the front of the vehicle (toward the front of the seat back 14) as viewed in the vertical direction of the seat back 14, and includes a back plate portion 40A, a left flange portion 40B, and a right flange portion 40C. The back plate portion 40A is formed in the shape of an elongated plate that extends in the vertical direction of the seat back 14, and is positioned such that its longitudinal direction is parallel to the vertical direction of the seat back 14, and its thickness direction is parallel to the front-back direction of the seat back 14. The back plate portion 40A is formed with upper and lower bolt holes 41 through which the upper and lower stud bolts 30A of the inflator 30 pass. The upper and lower stud bolts 30A pass through the rear end portion of the rear bag portion 34R and the module mounting portion 28B as described above, to be engaged with the nuts 44. In this manner, the back plate portion 40A, or the mounting bracket 40, is fastened and fixed to the outer side frame 24.

The left flange portion 40B extends from a widthwise outer end portion of the back plate portion 40A toward the front of the vehicle, and the right flange portion 40C extends from a widthwise inner end portion of the back plate portion 40A toward the front of the vehicle. These flange portions 40B, 40C are formed in the shape of elongated plates that extend in the vertical direction of the seat back 14, and are positioned such that their longitudinal directions are parallel to the vertical direction of the seat back 14, and their thickness directions are parallel to the vehicle width direction. The reaction force plate 38 is formed integrally with the right flange portion 40C.

<Configuration of Reaction Force Plate 38> As shown in FIG. 1 through FIG. 10, the reaction force plate 38 integrally extends toward the front side and upper side of the vehicle, from an upper portion of the right flange portion 40C of the mounting bracket 40. The reaction force plate 38 is formed in the shape of an elongated plate (a flat plate in this embodiment) that extends in the vertical direction of the seat back 14, and is positioned such that its thickness direction is parallel to the vehicle width direction. The reaction force plate 38 is housed in the rear bag portion 34R (side airbag body 34), and is located on the outer side of the outer side frame 24 in the vehicle width direction. The reaction force plate 38 is attached to the outer side frame 24 via the mounting bracket 40, and is supported by the outer side frame 24.

Figure 6:
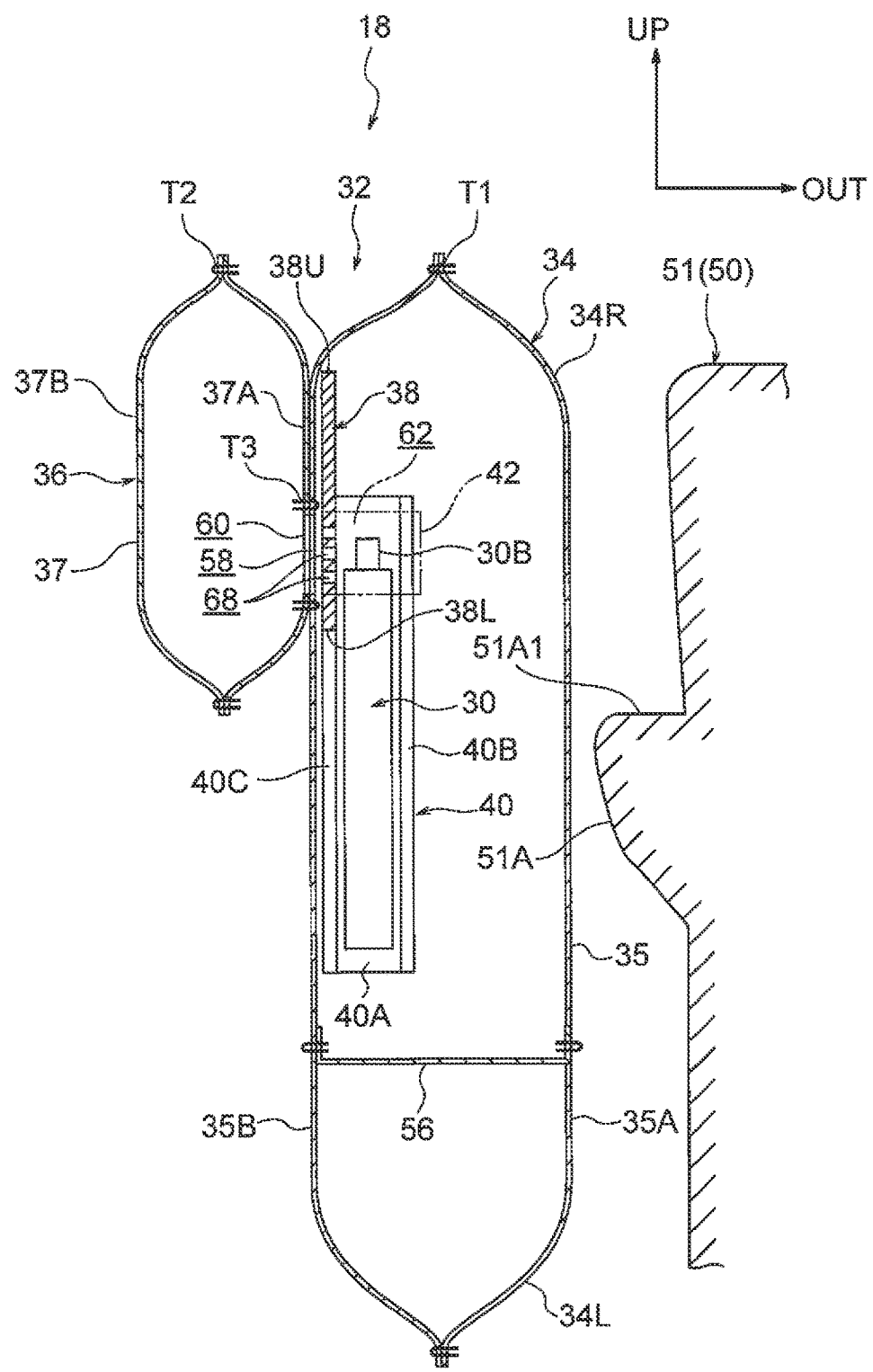
FIG. 6 is a cross-sectional view showing a cutting plane taken along line VI-VI of FIG. 5.
Figure 7:
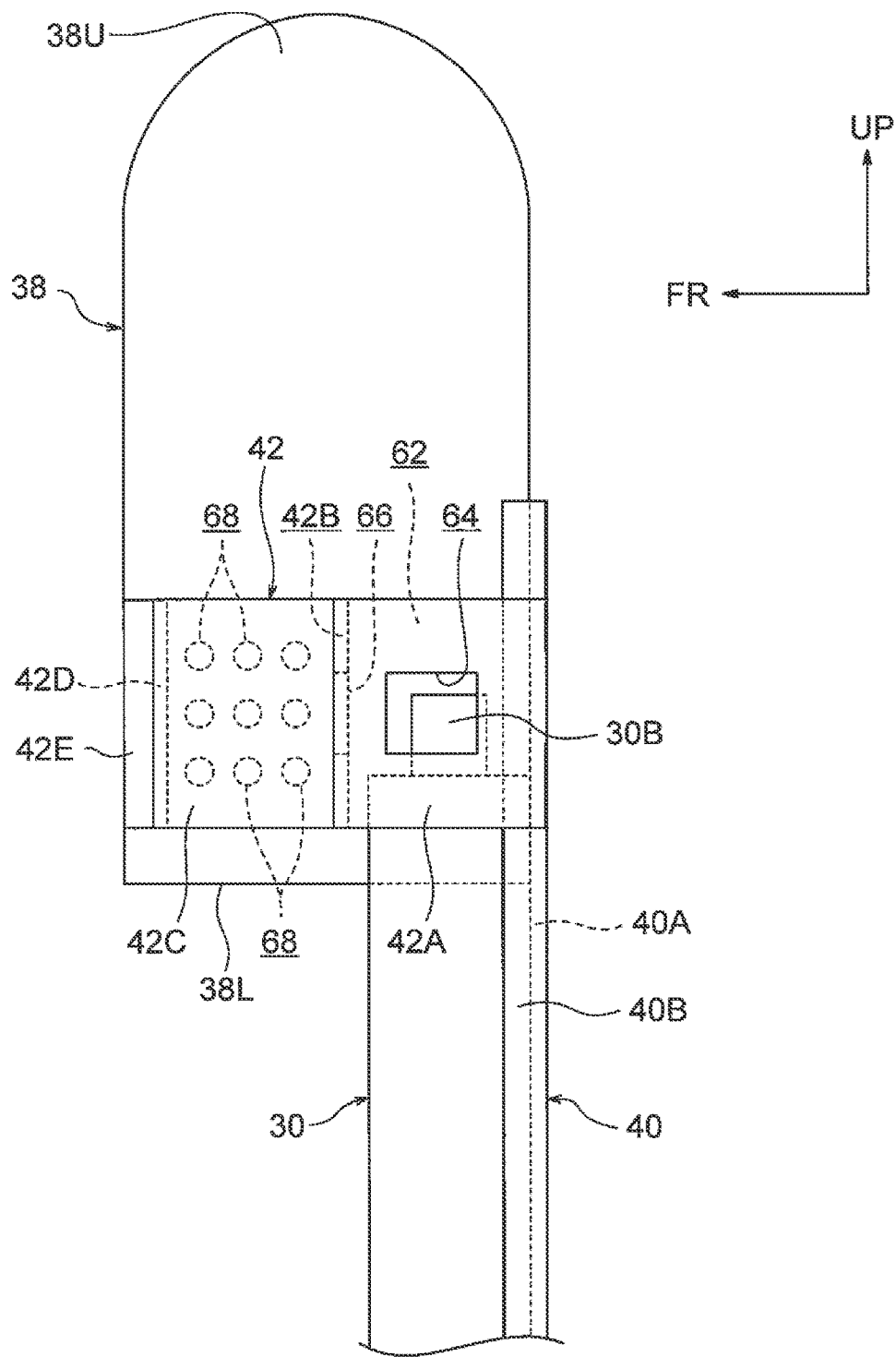
FIG. 7 is a side view showing a reaction force plate, mounting bracket, retainer, and an inflator.
Figure 8:
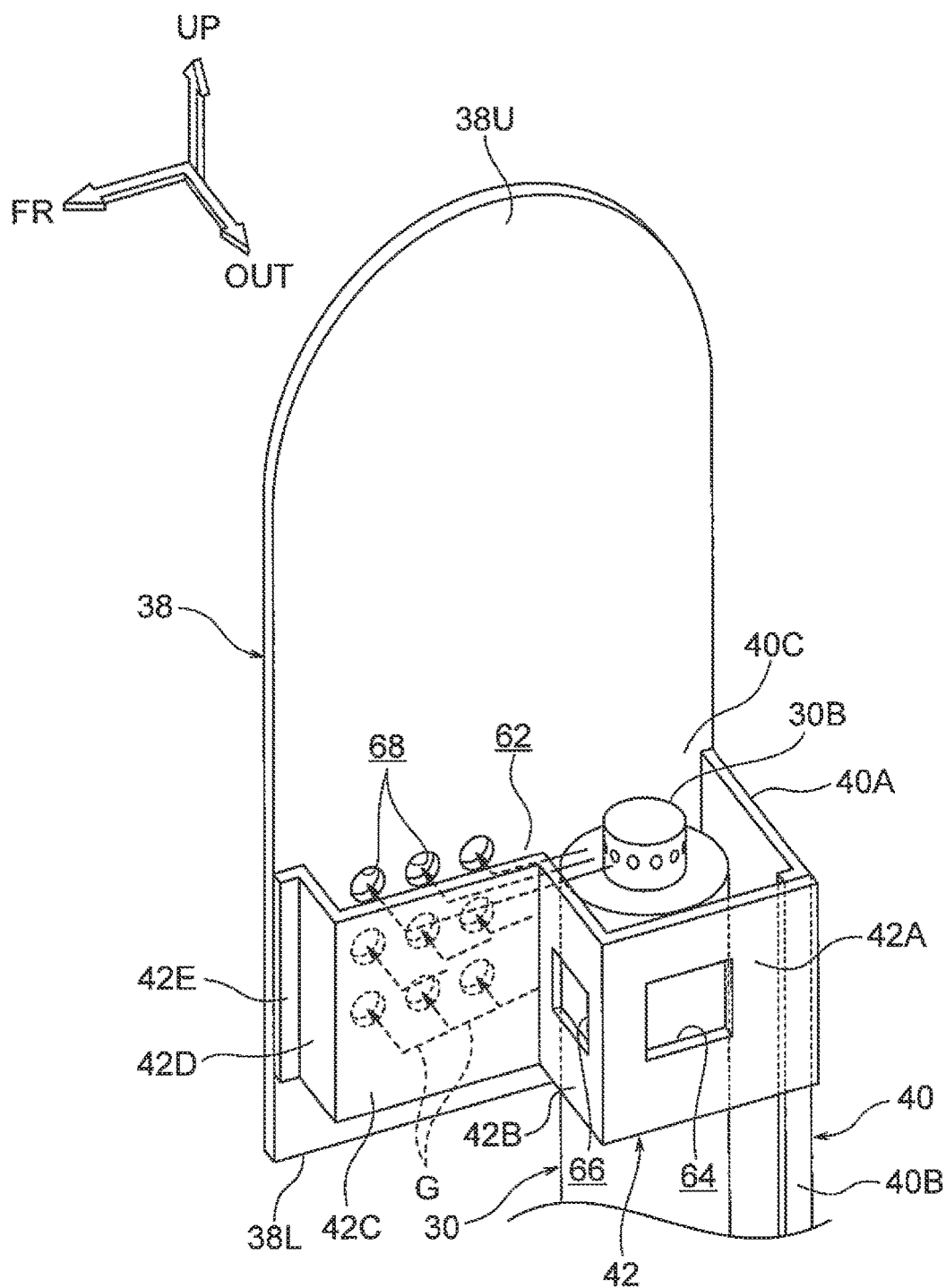
FIG. 8 is a perspective view of the arrangement shown in FIG. 7 as viewed from the outer side in the vehicle width direction and the upper side of the vehicle.

The reaction force plate 38 extends in the vehicle front-back direction as viewed in a plane section of the seat back 14 shown in FIG. 2 to FIG. 4, and also extends toward the front of the vehicle beyond a front edge portion 24F of the outer side frame 24 as viewed in a side view of the vehicle shown in FIG. 1, to be located on the outer side of the inside bag 36 in the vehicle width direction. The reaction force plate 38 is configured such that at least a part of the reaction force plate 38 overlaps with a rear part (preferably, the shoulder blade) of the chest region C of the occupant P as viewed in the side view of the vehicle. The reaction force plate 38 has an upper end 38U that is formed in an arcuate shape, and protrudes upward when seen from the vehicle width direction. Also, a lower end 38L of the reaction force plate 38 is located at a level higher than an upper surface 51A1 of an arm rest portion 51A provided on the door trim 51 of the front side door 50, as shown in FIG. 6.

The lower end 38L of the reaction force plate 38 is located at a level higher than an upper surface of a console box (not shown) placed on the center side of the vehicular seat 10 in the vehicle width direction, or an upper surface of an arm rest portion (not shown) (which will be called "seat-mounted arm rest portion") mounted on the center side of the seat back 14 in the vehicle width direction. Also, the lower end 38L of the reaction force plate 38 is located at a slightly lower level than the center (the center of gravity of the chest region C) of the chest middle rib R3 of the dummy P as viewed in the vehicle width direction. The retainer 42 is attached to the reaction force plate 38 and mounting bracket 40 as described above.

<Configuration of Retainer 42> As shown in FIG. 1-FIG. 4 and FIG. 6-FIG. 8, the retainer 42 is formed by bending a sheet metal into a generally crank shape in cross-section, for example, and is located on the outer side of the reaction force plate 38 in the vehicle width direction. As shown in FIG. 3, FIG. 4, FIG. 7, and FIG. 8, the retainer 42 consists of a rear side wall portion 42A that extends from an upper end portion of the left flange portion 40B of the mounting bracket 40 toward the front of the vehicle, a middle wall portion 42B that extends inward in the vehicle width direction from a front end portion of the rear side wall portion 42A, a front side wall portion 42C that extends from a widthwise inner end portion of the middle wall portion 42B toward the front of the vehicle, a front wall portion 42D that extends inward in the vehicle width direction from a front end portion of the front side wall portion 42C, and a front flange portion 42E that extends from a widthwise inner end portion of the front wall portion 42D toward the front of the vehicle.

A rear end portion of the rear side wall portion 42A is superimposed on the left flange portion 40B from the outer side in the vehicle width direction, and is joined to the left flange portion 40B by suitable means, such as welding. Also, the front flange portion 42E is superimposed on a front end portion of the reaction force plate 38 from the outer side in the vehicle width direction, and is joined to the reaction force plate 38 by suitable means, such as welding. The structure of the retainer 42 is not limited to the one as described above, but may be changed as appropriate. For example, the front flange portion 42E may be omitted, and the front wall portion 42D may be joined to the front end portion of the reaction force plate 38. Also, the retainer 42 may be configured to integrally extend from the left flange portion 40B (the retainer 42 may be formed integrally with the mounting bracket 40).

The retainer 42 constructed as described above covers the gas jetting part 30B of the inflator 30 and a part (lower part) of the reaction force plate 38. Space 62 that houses an upper end portion of the inflator 30 is formed between the retainer 42 and the reaction force plate 38. More specifically, the upper end portion of the inflator 30 is placed between the rear side wall portion 42A and the reaction force plate 38 and between the middle wall portion 42B and the back plate portion 40A. Also, outside gas supply holes 64, 66 for supplying gas from the inflator 30 into the rear bag portion 34R are formed in the rear side wall portion 42A and the middle wall portion 42B, respectively. The outside gas supply holes 64, 66 are opposed to the gas jetting part 30B provided in the upper end portion of the inflator 30, and the gas ejected from the gas jetting part 30B is supplied to the rear bag portion 34R through the outside gas supply holes 64, 66.

In this embodiment, the space 62 is open to the vehicle upper side and the vehicle lower side, and gas is also supplied to the rear bag portion 34R through the upper and lower openings. However, the disclosure is not limited to this arrangement. For example, the space 62 may be closed at at least one of the vehicle upper side and the vehicle lower side, by at least one of an upper wall portion and a lower wall portion provided on the retainer 42, for example.

The front side wall portion 42C is opposed to the reaction force plate 38 from the outer side in the vehicle width direction, with a gap provided therebetween. A multiplicity of through-holes 68 are formed in a portion of the reaction force plate 38 which is opposed to the front side wall portion 42C and is located on the front side of the vehicle relative to the gas jetting part 30B. The multiplicity of through-holes 68 constitute an inside gas supply hole for supplying gas from the inflator 30 to the inside bag 36. The through-holes 68 are circular punch holes that pass through the reaction force plate 38 in the vehicle width direction, and the axial direction of each through-hole 68 is parallel to the vehicle width direction (see FIG. 11A).

Figure 9:
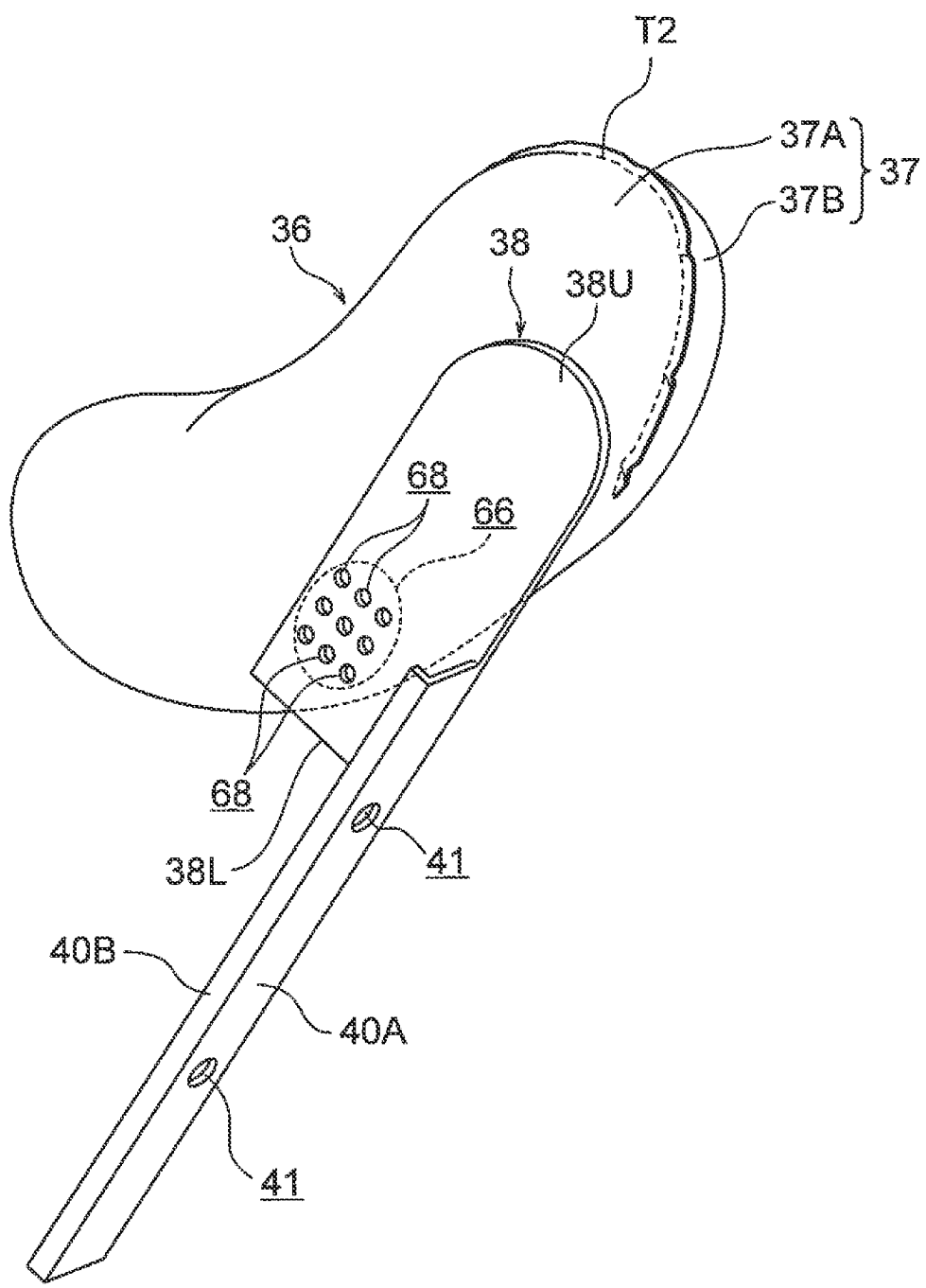
FIG. 9 is a perspective view of the inside bag, reaction force plate, and the mounting bracket, as viewed from the outer side in the vehicle width direction and the rear side of the vehicle.
Figure 10:
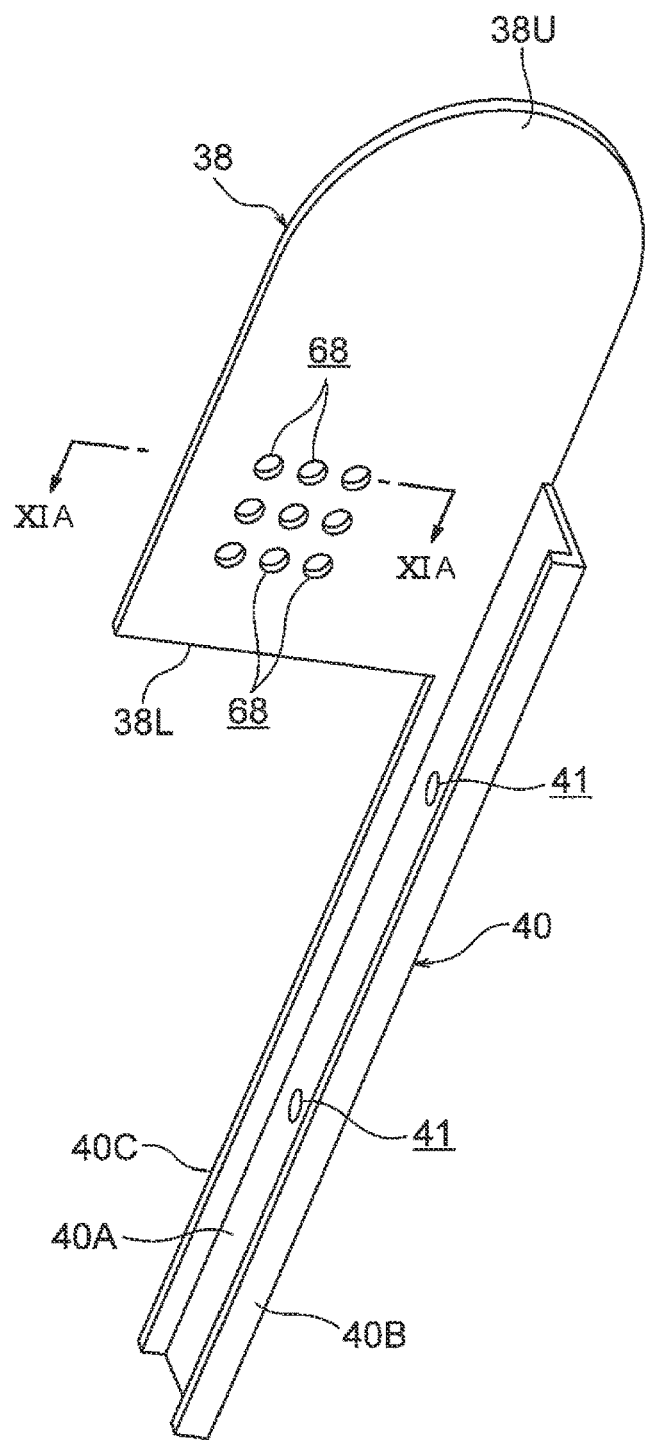
FIG. 10 is a perspective view of the reaction force plate and the mounting bracket, as viewed from the outer side in the vehicle width direction and the upper side of the vehicle.

As shown in FIG. 6 and FIG. 9, the through-holes 68 are formed at positions that overlap the communication port 58 (not shown in FIG. 9) of the side airbag body 34 and the communication port 60 of the inside bag 36, from the outer side in the vehicle width direction. Thus, the above-described space 62 communicates with the interior of the inside bag 36 via the communication ports 58, 60. Apart of the gas ejected from the gas jetting part 30B of the inflator 30 flows between the front side wall portion 42C of the retainer 42 and the reaction force plate 38, and is supplied into the inside bag 36 via the through-holes 68 and the communication ports 58, 60 (see arrows G in FIG. 8 and FIG. 11A).

<Operation and Effects> Next, the operation and effects of this embodiment will be described.

According to the vehicular seat 10 constructed as described above, the ECU 46 activates the inflator 30 when it detects a side-impact crash based on a signal from the side impact sensor 48. As a result, the side airbag body 34 placed on the widthwise outer side of the outer side frame 24 within the outer side portion 14A inflates and deploys between the side portion of the vehicle interior and the occupant P, and the inside bag 36 connected to a widthwise inner region of the side airbag body 34 on the vehicle front side of the outer side frame 24 inflates and deploys in the outer side portion 14A. The inside bag 36 completes inflation and deployment earlier than the side airbag body 34, and presses the occupant P inward in the vehicle width direction.

The above inside bag 36 inflates and deploys at the upper level than the abdominal region B of the occupant P. Thus, the abdominal region B having a relatively low load tolerance, in the body of the occupant P, is prevented from being directly pressed by the inside bag 36; therefore, the internal pressure of the inside bag 36 can be increased. Further, reaction force is applied inward in the vehicle width direction from the reaction force plate 38 supported by the outer side frame 24, to the inside bag 36. The reaction force plate 38 extends in the vehicle front-back direction as viewed in a plane section of the seat back 14, and also extends toward the front of the vehicle beyond the front edge portion 24F of the outer side frame 24. With this arrangement, reaction force can be favorably applied inward in the vehicle width direction to the inside bag 36, even at a level (for example, at the upper level than the center of gravity of the chest region C of the occupant P) at which reaction force is unlikely to be applied inward in the vehicle width direction from the outer side frame 24 to the inside bag 36.

Thus, according to this embodiment, the occupant P can be effectively moved inward in the vehicle width direction at an early opportunity, by means of the inside bag 36, and the initial occupant restraint performance of the inside bag 36 can be improved. As a result, it is possible to effectively reduce the inertia energy of the occupant P, and move the occupant P away from the crash location, before the side airbag body 34 that completes inflation and deployment later than the inside bag 36 receives reaction force from the door trim 51, etc. of the front side door 50, and restrains the occupant P.

Also, in this embodiment, at least a part of the inside bag 36 that is inflated and deployed overlaps the shoulder blade of the occupant P as viewed in the vehicle width direction. Thus, the shoulder blade of the occupant P can be pressed inward in the vehicle width direction, by at least a part of the inflated/deployed inside bag 36. Since the shoulder blade of the occupant P has a relatively high load tolerance in the body of the occupant P, and also extends laterally, it is possible to increase the internal pressure of the inside bag 36 and effectively move the occupant P inward in the vehicle width direction.

Also, in this embodiment, the reaction force plate 38 is disposed on the outer side of the outer side frame 24 in the vehicle width direction. This arrangement makes it easy to prevent the occupant P that lies against the seat back 14 from having a feeling of a foreign body due to the reaction force plate 38, and ensure installation space for the reaction force plate 38. Furthermore, since a part of the reaction force plate 38 is arranged to overlap the rear part of the chest region C of the occupant P as viewed in the vehicle width direction, the reaction force can be effectively applied inward in the vehicle width direction from the reaction force plate 38, to the rear part of the chest region C, via the inside bag 36.

Further, in this embodiment, the lower end 38L of the reaction force plate 38 is located at a level higher than the upper surface 51A1 of the arm rest portion 51A provided on the door trim 51 of the front side door 50. Thus, the reaction force plate 38 is placed at a level higher than a narrow gap between the arm rest portion 51A of the front side door 50 and the outer side frame 24 of the seat back 14; therefore, the installation space for the reaction force plate 38 is easily secured. Also, the lower end 38L of the reaction force plate 38 is located at a level higher than the upper surface of the console box (not shown) placed on the center side of the vehicular seat 10 in the vehicle width direction, or the upper surface of the arm rest portion mounted on the seat. Thus, the pressing force of the inside bag 36 that receives reaction force from the reaction force plate 38 and presses the occupant P inward in the vehicle width direction acts on the occupant P at a level higher than the console box and the seat-mounted arm rest portion. It is thus possible to effectively press the occupant P inward in the vehicle width direction, without being affected by these surrounding members.

Also, in this embodiment, the reaction force plate 38 constitutes the airbag module 19, and is formed integrally with the mounting bracket 40 attached to the outer side frame 24. Thus, the reaction force plate 38 can be reinforced with the mounting bracket 40, and therefore the reaction force applied from the reaction force plate 38 to the inside bag 36 can be increased. As a result, it is possible to further improve the effect of moving the occupant P inward in the vehicle width direction, in the initial period of a side-impact crash. Further, the mounting bracket 40 assumes a generally U shape in cross-section as viewed in the vertical direction of the seat back 14, and is open toward the front of the vehicle. Therefore, as compared with the case where the mounting bracket 40 is formed in the shape of a flat plate, and consists solely of the back plate portion 40A, for example, the rigidity of the mounting bracket 40 against a load in the vehicle width direction is increased. As a result, the above effect can be further enhanced. Also, since the reaction force plate 38 is integral with the mounting bracket 40, the number of components can be reduced, and the cost of production can be reduced.

Further, in this embodiment, the mounting bracket 40 formed integrally with the reaction force plate 38 is fastened and fixed to the module mounting portion 28B of the outer side frame 24, by use of the stud bolts of the inflator 30. With this arrangement, no dedicated fastening member for fastening and fixing the reaction force plate 38 and the mounting bracket 40 to the outer side frame 24 is needed. Further, the module mounting portion 28B of the outer side frame 24 extends outward in the vehicle width direction; therefore, the fastening operation can be performed outside the outer side frame 24 in the vehicle width direction, with high efficiency.

Also, in this embodiment, the gas jetting part 30B is provided in the upper end portion of the inflator 30 that is formed in an elongated shape having a longitudinal direction parallel to the vertical direction of the seat back 14. Thus, the gas jetting part 30B can be located close to the inside bag 36 that inflates and deploys at a level higher than the abdominal region B of the occupant P, which makes it easy to supply gas to the inside bag 36 at an early opportunity. This arrangement contributes to early inflation and deployment of the inside bag 36.

Further, in this embodiment, the retainer 42 covers the gas jetting part 30B of the inflator 30 and a part of the reaction force plate 38, from the outer side in the vehicle width direction, and the multiplicity of through-holes 68 (inside gas supply holes) for supplying gas from the inflator 30 to the inside bag 36 are formed, in a region of the reaction force plate 38 which is opposed to the retainer 42 and is located closer to the front of the vehicle than the gas jetting part 30B. Therefore, gas ejected from the gas jetting part 30B of the inflator 30 flows between the front side wall portion 42C of the retainer 42 and the reaction force plate 38, and is supplied to the inside bag 36 through the through-holes 68 formed in the reaction force plate 38. Thus, even with the arrangement in which the inflator 30 is placed only on the widthwise outer side of the outer side frame 24 where installation space can be easily secured, gas can be promptly supplied to the inside bag 36. This arrangement further contributes to early inflation and deployment of the inside bag 36.

Further, the gas supply channel to the inside bag 36 and the installation space of the reaction force plate 38 can be overlapped with each other, so that restrictions on the installation space of the reaction force plate 38 are reduced, and the size of the reaction force plate 38 can be enlarged. Also, a portion of the reaction force plate 38 having the multiplicity of through-holes 68 can also function as a reaction force surface that applies reaction force to the inside bag 36. This arrangement makes it easy to ensure a wide area of reaction force surface, as compared with the arrangement in which one large inside gas supply hole is formed in the reaction force plate 38.

Also, in this embodiment, the outside gas supply holes 64, 66 for supplying gas ejected from the gas jetting part 30B to the rear bag portion 34R of the side airbag body 34 are formed in portions of the retainer 42 which are opposed to the gas jetting part 30B. Namely, in this embodiment, the gas ejected from the gas jetting part 30B of the inflator 30 is supplied to the inside bag 36 through the multiplicity of through-holes 68 (inside gas supply holes) formed in the reaction force plate 38, and is also supplied to the side airbag body 34 through the outside gas supply holes 64, 66 formed in the retainer 42. Accordingly, it is possible to easily change (adjust) the timing of completion of inflation and deployment of the inside bag 36 and the side airbag body 34, by adjusting the opening areas of the through-holes 68 and the outside gas supply holes 64, 66.

Further, in this embodiment, the inside bag 36 prior to inflation and deployment is accordion-folded on the inner side of the outer side frame 24 in the vehicle width direction. The according-folding is excellent in terms of the inflation and deployment performance, and thus contributes to early inflation and deployment of the inside bag 36.

Figure 11A:
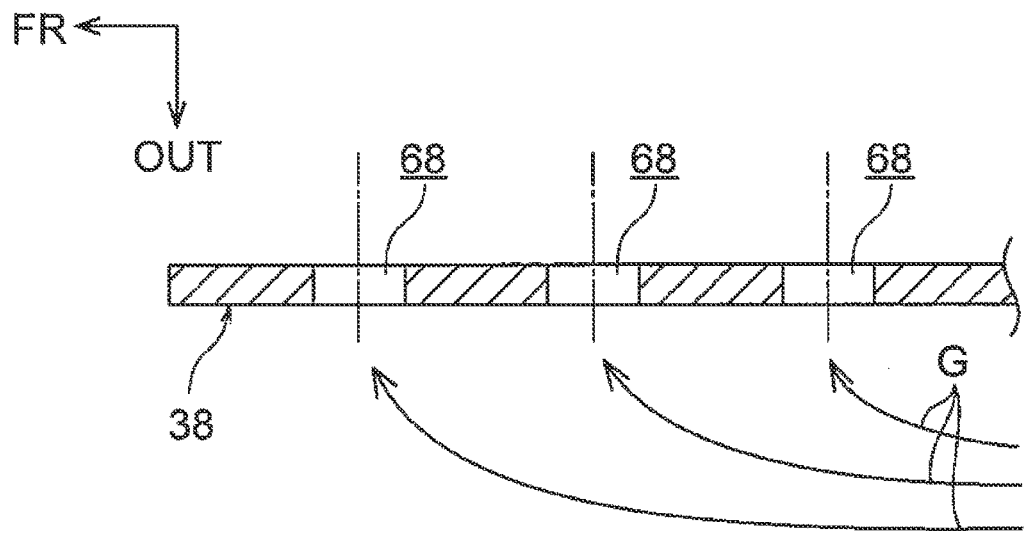
FIG. 11A is an enlarged cross-sectional view showing a cutting plane taken along line XIA-XIA of FIG. 10.
Figure 11B:
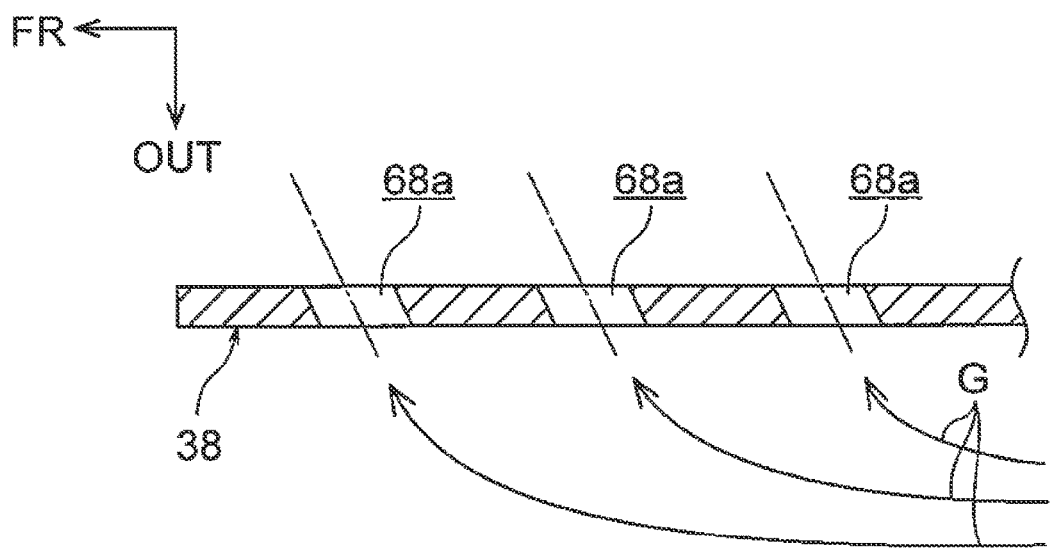
FIG. 11B is a cross-sectional view corresponding to FIG. 11A, showing a first modified example of a multiplicity of through-holes.

<Additional Description of Embodiment> In this embodiment, the multiplicity of through-holes 68 are configured such that the axial direction of each through-hole 68 is parallel to the vehicle width direction, as shown in FIG. 11A. However, this disclosure is not limited to this arrangement. For example, as in a first modified example shown in FIG. 11B, a multiplicity of through-holes 68a may be configured to be inclined such that the axis of each through-hole 68a becomes closer to the front of the vehicle, in a direction toward the inner side in the vehicle width direction. In the first modified example in which the through-holes 68a are inclined as described above, gas ejected from the gas jetting part 30B located on the rear side of the through-holes 68a is likely to smoothly flow into the through-holes 68a (see arrows G in FIG. 11B). Accordingly, the inflation and deployment of the inside bag 36 can be easily made earlier.

Figure 11C:
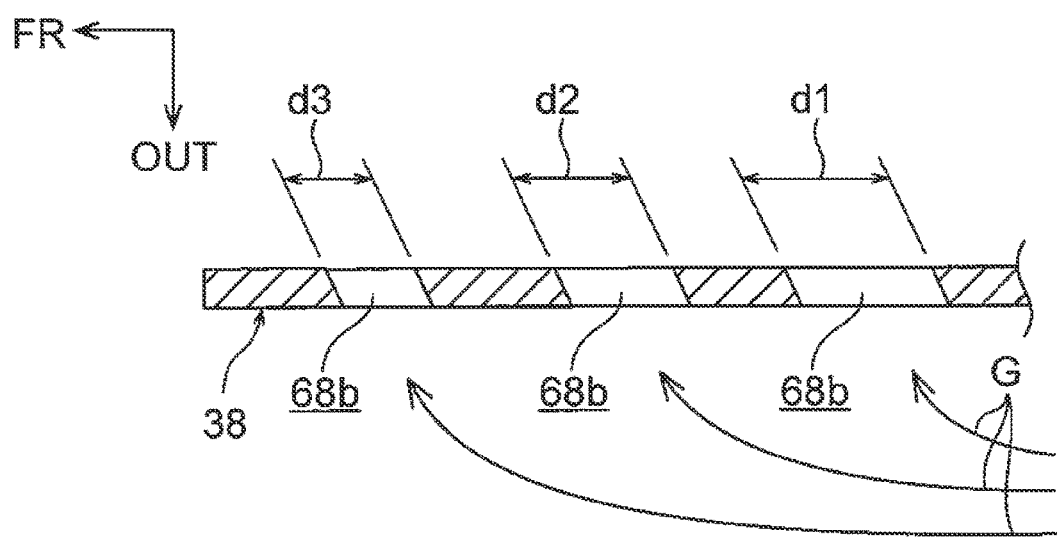
FIG. 11C is a cross-sectional view corresponding to FIG. 11A, showing a second modified example of the multiplicity of through-holes.

Also, the reaction force plate 38 may be configured as in a second modified example shown in FIG. 11C. In the second modified example, the through-holes 68b are inclined such that the axis of each through-hole 68b becomes closer to the front of the vehicle, in a direction toward the inner side in the vehicle width direction, like the through-holes 68a in the first modified example. In addition, in the second modified example, the opening area of each of the through-holes 68b is increased from the one remotest from the gas jetting part 30B to the one closest to the gas jetting part 30B (d1>d2>d3 in FIG. 11C). With this arrangement, the gas ejected from the gas jetting part 30B can efficiently flow into the through-holes 68b (see arrows G in FIG. 11C). Consequently, the inflation and deployment of the inside bag 36 are likely to be made further earlier.

While the reaction force plate 38 is formed integrally with the mounting bracket 40 in this embodiment, the disclosure is not limited to this arrangement, but the reaction force plate 38 may be formed as a separate member from the mounting bracket 40, and may be attached to the outer side frame 24, separately from the mounting bracket 40. Also, the mounting bracket 40 may be omitted.

Further, in this embodiment, the reaction force plate 38 is housed, along with the mounting bracket 40, within the side airbag body 43. However, the disclosure is not limited to this arrangement, but the reaction force plate 38 and the mounting bracket 40 may be disposed outside the side airbag body 34. In this case, the reaction force plate 38 is located between the side airbag body 34 and the inside bag 36, at a level higher than the communication ports 58, 60, for example, and the multiplicity of through-holes 68 of the reaction force plate 38 are omitted.

Also, while the retainer 42 (gas guide plate) is attached to the reaction force plate 38 and the mounting bracket 40 in this embodiment, the disclosure is not limited to this arrangement. For example, when the reaction force plate 38 is located outside the side airbag body 34, for example, the gas guide plate may be omitted. However, in this case, a gas guide member for guiding gas from the inflator 30 into the inside bag 36 is preferably provided within the side airbag body 34.

Further, in this embodiment, the lower end 38L of the reaction force plate 38 is located at a level higher than the upper surface 51A1 of the arm rest portion 51A of the door trim 51. However, this disclosure is not limited to this arrangement, but the lower end 38L of the reaction force plate 38 may be located at the lower level of the vehicle than the upper surface 51A1 of the arm rest portion 51A.

Also, in this embodiment, the inside bag 36 prior to inflation and deployment is configured to be accordion-folded on the inner side of the outer side frame 24 in the vehicle width direction, but the disclosure is not limited to this arrangement. For example, the inside bag 36 prior to inflation and deployment may be configured to be folded in two on the inner side of the outer side frame 24 in the vehicle width direction.

The disclosure may be embodied with various changes or modifications, without departing from the principle of the disclosure. It is also to be understood that the scope of right of this disclosure is not limited to the above embodiment.

What is claimed is:

1. A vehicular seat installed with a side airbag device, comprising:
    a seat back including a side frame and a side portion on an outer side in a vehicle width direction;
    an inflator placed on an outer side of the side frame in the vehicle width direction, within the side portion of the seat back;
    an outside bag placed on the outer side of the side frame in the vehicle width direction, within the side portion, the outside bag being adapted to inflate and deploy between a side portion of a vehicle interior and an occupant, when gas is supplied from the inflator housed in the outside bag;
    an inside bag connected to an inner portion of the outside bag in the vehicle width direction, on a vehicle front side of the side frame, the inside bag being adapted to inflate and deploy inward in the vehicle width direction from the side portion when gas is supplied from the inflator, the inside bag being adapted to inflate and deploy at a level higher than an abdominal region of the occupant, the inside bag being adapted to complete inflation and deployment earlier than the outside bag, so as to press the occupant inward in the vehicle width direction; and
    a reaction force plate that extends in a vehicle front-back direction as viewed in a plane section of the seat back, the reaction force plate being supported by the side frame such that the reaction force plate extends toward a front of the vehicle beyond a front edge portion of the side frame as viewed in a side view of the vehicle, the reaction force plate being adapted to apply reaction force inward in the vehicle width direction, to the inside bag, at a time of inflation and deployment.

2. The vehicular seat according to claim 1, wherein at least a part of the inside bag that is inflated and deployed is adapted to overlap with a shoulder blade of the occupant as viewed in the side view of the vehicle.

3. The vehicular seat according to claim 1, wherein a lower end of the reaction force plate is configured to be located at a level higher than an upper surface of an arm rest portion provided on a door trim of a side door.

4. The vehicular seat according to claim 1, further comprising a mounting bracket housed in the outside bag, the mounting bracket, the inflator, the outside bag, and the inside bag constituting an airbag module, the mounting bracket being attached to the side frame, wherein
    the reaction force plate is formed integrally with the mounting bracket.

5. The vehicular seat according to claim 4, wherein:
    the side frame has a module mounting portion that extends outward in the vehicle width direction; and
    the mounting bracket is fastened and fixed to the module mounting portion, by use of a stud bolt of the inflator.

6. The vehicular seat according to claim 1, wherein the inflator is formed in an elongated shape having a longitudinal direction parallel to a vertical direction of the seat back, the inflator having a gas jetting part provided in an upper end portion, and allowing gas to be ejected from the gas jetting part.

7. The vehicular seat according to claim 6, wherein:
    the reaction force plate is housed in the outside bag;
    a part of the reaction force plate and the gas jetting part of the inflator are covered from an outer side in the vehicle width direction with a gas guide plate; and
    an inside gas supply hole for supplying gas from the inflator into the inside bag is formed in a portion of the reaction force plate which is opposed to the gas guide plate and is located closer to the front of the vehicle than the gas jetting part.

8. The vehicular seat according to claim 7, wherein the inside gas supply hole comprises a multiplicity of through-holes.

9. The vehicular seat according to claim 8, wherein the multiplicity of through-holes are inclined so as to be closer to the front of the vehicle, in a direction toward an inner side in the vehicle width direction.

10. The vehicular seat according to claim 8, wherein the multiplicity of through-holes are formed such that an opening area of one of the through-holes is larger as the one is located closer to the gas jetting part.

11. The vehicular seat according to claim 7, wherein an outside gas supply hole for supplying gas ejected from the gas jetting part to the outside bag is formed in a portion of the gas guide plate which is opposed to the gas jetting part.

12. The vehicular seat according to claim 1, wherein the inside bag prior to inflation and deployment is accordion-folded on an inner side of the side frame in the vehicle width direction.

13. The vehicular seat according to claim 1, wherein:
    the outside bag is partitioned into a front bag and a rear bag by a partition part;
    the inflator is housed in the rear bag of the outside bag; and
    the inside bag is connected to the rear bag of the outside bag.

* * * * *